United States Patent [19]
Pauli et al.

[11] 4,277,143
[45] Jul. 7, 1981

[54] LIQUID CRYSTAL CELL HAVING ELECTRODES ON ADJACENT PLATES CONNECTED BY A CONTACT BRIDGE AND THE PROCESS OF PRODUCING SAME

[75] Inventors: Arthur G. Pauli; Reinhart Schade; Karl Stiel, all of Munich, Fed. Rep. of Germany

[73] Assignee: Siemens Aktiengesellschaft, Berlin & Munich, Fed. Rep. of Germany

[21] Appl. No.: 928,824

[22] Filed: Jul. 28, 1978

[30] Foreign Application Priority Data

Aug. 5, 1977 [DE] Fed. Rep. of Germany ....... 2735493

[51] Int. Cl.³ .............................................. G02F 1/133
[52] U.S. Cl. ................................ 350/334; 350/339 R; 350/331 R; 350/343
[58] Field of Search .................... 350/343, 331 R, 334, 350/339 R

[56] References Cited

U.S. PATENT DOCUMENTS

| | | | |
|---|---|---|---|
| 3,751,137 | 8/1973 | Fitzgibbons et al. ................ | 350/343 |
| 3,932,024 | 1/1976 | Yaguchi et al. ...................... | 350/338 |
| 3,994,568 | 11/1976 | King et al. ......................... | 350/344 X |
| 4,094,058 | 6/1978 | Yasutake et al. .................... | 350/331 |
| 4,106,860 | 8/1978 | Kaufmann ............................ | 350/343 |
| 4,150,877 | 4/1979 | Kobale et al. ........................ | 350/341 |

FOREIGN PATENT DOCUMENTS

1381429 1/1975 United Kingdom ..................... 350/343

*Primary Examiner*—Edward S. Bauer
*Attorney, Agent, or Firm*—Hill, Van Santen, Steadman, Chiara & Simpson

[57] ABSTRACT

A liquid crystal cell having a pair of carrier plates, which are spaced apart from one another by a frame with each of the plates on an inner surface containing electrically conductive coatings, characterized by the electrical conductive coatings on one of the two carrier plates forming an electrode and being connected to a terminal electrode arranged on the inner surface of the other character plate by a conductor bridge, which is located on the outside of the frame and comprises a metallization which serves to contact the two end surfaces of the two electrodes which end surfaces extend to the plane of the edges of their respective carrier plate. The process for forming the liquid crystal cell includes forming a plurality of the carrier plates on a single member and subsequently subdividing the single member into the individual carrier plates with the step of subdividing ensuring that the edge of the electrodes lies in the plane of the edge of the carrier plate. In addition, the process includes providing an insulating layer with the edge of the electrodes being masked and also portions adjacent the edge of the electrodes being masked from the material forming the insulating layer.

7 Claims, 3 Drawing Figures

LIQUID CRYSTAL CELL HAVING ELECTRODES ON ADJACENT PLATES CONNECTED BY A CONTACT BRIDGE AND THE PROCESS OF PRODUCING SAME

BACKGROUND OF THE INVENTION

1. Field of the Invention

The present invention is directed to a liquid crystal cell and the method of making it, which cell has two carrier plates which are spaced from one another by an interposed frame and which have inner surfaces facing each other provided with electrically conductive coatings and preferably covered by insulating layers with at least one electrically conductive coating on one of the two carrier plates being an electrode which is connected to a terminal electrode disposed on the other plate by a conductor bridge which is disposed on the outside of the frame and contains at least one metallizing layer.

2. Prior Art

Liquid crystal cells, which have conductive coatings on the inner surfaces of the carrier plates, which are spaced apart by a frame and which have at least one of the conductive coatings forming electrode which is connected by a contact bridge to a terminal electrode on the other surface, are disclosed in British Patent No. 1,381,429, which corresponds to German Offenlegungsschrift No. 23 33 206 and in British Patent No. 1,478,327, which corresponds to German Offenlegungsschrift No. 23 50 000.

A drive component of a liquid crystal cell can most easily be contacted by arranging all the cell terminals on one of the carrier plates as disclosed in U.S. Pat. No. 3,947,090, which corresponds to German Offenlegungsschrift No. 22 40 781. Therefore, in virtually all of the liquid crystal displays, the electrodes on one carrier plate are connected to the opposite carrier plate. In fact, generally, the rear electrode is connected to a terminal electrode in the plane of the front or segmented electrode on the front carrier plate when taken from the view of the observer. To form this contact, a contact or conductive bridge, which must overcome a distance of approximately 10 μm, must provide a permanently good contact and must be producible without any particular outlay and in particular without any manual operative steps.

For some years, technology has endeavored to produce a through contact which is suitable for mass production, and to this end technology has produced widely different concepts for making these contacts. For example, it has been proposed that the electrode, which is to be lead across, and its terminal electrode should lead out from the end face of their respective carrier plates and thus be bent outward and extend around and onto the edge of the carrier plates and then be connected to one another by a metallization layer (see for example, British Pat. No. 1,381,429). However, as disclosed in British Pat. No. 1,478,327, a reliable contact can be established in this way only if the portion of the electrode, which portion bends around the edge of the carrier plate and which portion is subjected to considerable heat stresses during the subsequent securing of the frame, consist of a different material than the conductive coatings on the surface of the carrier plate and is, for example, aluminum, and if a further solid conductor component is added to the metallization. It is obvious that a conductor bridge designed in this manner will involve considerable production expenses and will necessitate special additional provisions in particular if the carrier plates are to be coated with an insulating layer. Consequently, the present practice is still to employ makeshift measures in which the conductive bridge is manually applied to the exterior of the finished cell as disclosed in Tobias, *International Handbook of Liquid Crystal Displays*, Ovum Press Limited, 1975, Section 7.3.5.

SUMMARY OF THE INVENTION

The present invention is directed to providing a liquid crystal cell and the method of making it in which a reliable through contact or conductive bridge between an electrode disposed on one carrier plate and a terminal electrode on the other carrier plate can be produced economically and in accordance with mass production techniques even when an insulating layer is applied on the conductive layers of the carrier plates.

To accomplish these tasks, the present invention is directed to an improvement in a liquid crystal cell comprising two carrier plates, which are spaced from one another by a frame and have inner surfaces which face towards each other and contain electrical conductive coatings, at least one of the electrical conductive coatings on one of the two carrier plates forming an electrode and being connected to a terminal electrode arranged on the inner surface of the other carrier plate by a conductive bridge, which is located on the outside of the frame and comprises at least one metallizing layer which serves to contact the two electrodes. The improvement comprises each of the electrodes extending to an edge of their respective carrier plates and having an end or edge surface lying in the plane of the edge of the respective carrier plate and wherein the conductive bridge comprises at least one metallizing layer in electrical contact with each of the ends or edge surfaces of each of said electrodes. Preferably, the electrical conductive coatings forming the electrodes are provided with an insulating layer, which cover a portion thereof. Each of the liquid crystal cells may have a plurality of the conductive bridges and preferably the frame of the liquid crystal cell is a glass solder frame which contains an opening and at least one of the conductive bridges is disposed adjacent the opening with the metallized layers of the conductive bridge being closed off by a solder plug disposed in said opening. Preferably, one of the metallized layers can consist of gold.

The process of the present invention preferably forms a liquid crystal cell and includes providing a first plate member having the first conductive coatings disposed thereon in a plurality of repeating patterns, providing a second plate member having second conductive coatings provided thereon as a plurality of repeating patterns, either securing the plates together with solder frames and then subdividing the secured plate members into a plurality of liquid crystal cells composed of the individual carrier plates or subdividing the plate members into individual carrier plates prior to the step of securing the plates together with the frames to form the cell.

In addition, if an insulating coating is provided, the process includes providing a mask on a portion of the conductive coating adjacent the conductive bridge and then covering the exposed portions of each of the conductive coatings with an insulating layer. The step of providing a mask may comprise arranging the individual carrier plates in overlapping stacks in a manner similar to roof tiles or fish scales with the area adjacent the electrode end surfaces being masked by the overlapping portion. Insulating layer is preferably provided by a chemical vapor deposition process.

The experences have indicated that in the actual fact, conductive surfaces at the edges of the carrier plates and solid conductor bridges can be dispensed with provided the exposed electrode end faces are provided and these faces are connected to electrically conductive metallizations or metal layers. Under these conditions, a satisfactory contact is established even when the electrodes consist of conventional materials, such as, for example, tin oxide, and have a normal thickness. No particular requirements are made on the metallizing layer. It is only necessary that they adhere to the substrate and be sufficiently conductive. Thus, for example, a three layer metallization such as chrome/nickel (copper)/gold, which are normally exployed is soft solder fixing of glass components, can be used. A gold metallization provides an excellent contact.

The conductive bridge design of the liquid crystal cell according to the present invention does not necessitate any additional operating steps if the filling opening for the cells is arranged in a known manner in the region of the conductive bridge.

A cell in accordance with the invention can be produced particularly easily in two ways. In the first production variation, the conductive coatings of a plurality of carrier plates are first produced on a large plate member substrate with a repeating pattern. Thereupon, the substrate is possibly coated with an insulating layer and only thereafter is divided into the individual carrier plates. With a simultaneous coating of this type of a plurality of plate members, the desired electrode cross sections are automatically established in the planes of the separation surfaces as the insulating layers fully coat the conductive layers.

In another process sequence, which is likewise suitable for large production, individual carrier plates are provided with their relevant electrodes and then are provided with an insulating layer. When providing the insulating layer, a plurality of plates are assembled in such a manner that they partially overlap in a manner similar to roof tiles or fish scales. In this way, the areas of the conductive coatings adjacent the through contact or conductive bridge can be easily masked by the overlapping plates and kept free of an insulating material. This provides particularly good results if the insulating layer is deposited in a so-called chemical vapor deposition process.

Other advantageous embodiments and further developments of the invention will be readily apparent from the description of the preferred exemplary embodiments and the claims.

DESCRIPTION OF THE PREFERRED EMBODIMENTS

Figure 1:
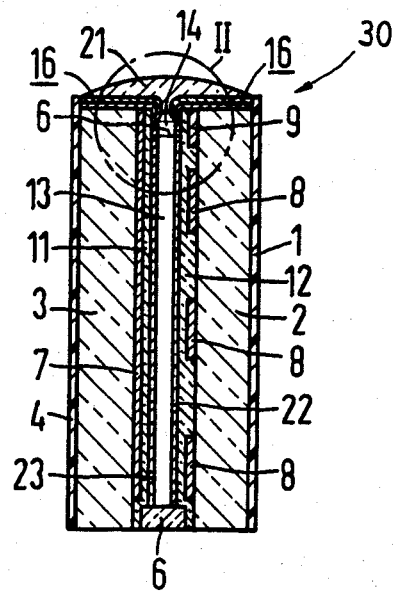
FIG. 1 is a cross-sectional view extending through a filling operation of a liquid crystal cell in accordance with the present invention.

The principles of the present invention are particularly useful in a liquid crystal cell generally indicated at 30 in FIG. 1. The liquid crystal cell 30 is illustrated as a one digit display operating in accordance with the Schadt-Helfrich effect. It should be noted that portions of the cell which are not necessary for understanding the present invention, for example, the individual electrical supply lines, have been omitted from the drawings for the sake of simplicity.

Figure 2:
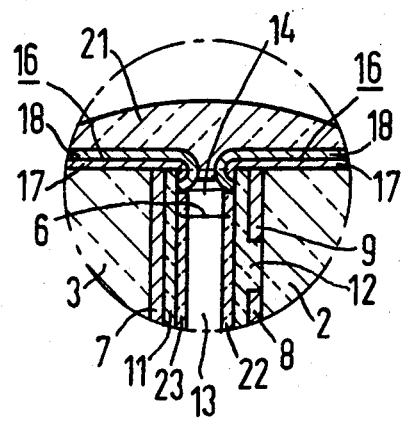
FIG. 2 is an enlarged portion of the exemplary embodiment enclosed in the circle generally indicated at II in FIG. 1.

Liquid crystal cell 30 has a front polarizer 1, a front carrier plate 2, a rear carrier plate 3 and a rear linear polarizer 4 which is arranged with the direction of polarization of the polarizer 4 extending at a right angle to the direction of polarization of the polarizer 1. The two carrier plates are maintained at a specific distance from one another by a glass solder frame 6 and on their inner surfaces which face towards one another are provided with conductive coatings with at least the conductive coating on the front carrier plate 2 being transparent. As illustrated, the rear carrier plate 3 has a continuous conductive coating forming electrode 7 and the front carrier plate 2 has a segmented front conductive coating forming a segmented front electrode 8. In addition, the carrier plate 2 has a terminal electrode 9. Each of the electrodes 7, 8 and 9 are covered by an insulating layer with an insulating layer 11 covering the electrode 7 and an insulating layer 12 covering the electrodes 8 and 9. In addition, orientation layers 22 and 23 are provided. The chamber formed by the frame 6 and the two carrier plates 2 and 3 contains the liquid crystal layer 13 (FIG. 2). Molecules of this layer will be aligned to be parallel to the surfaces of the plate with the aid of the orientation layers 22 and 23 and due to the arrangement of the orientation layers 22 and 23, the direction of the molecules adjacent the plate 3 are at right angles to the direction of molecules adjacent the plate 2 so that the direction turns through an angle of 90° along the plate normal. Thus, the cell 30 is a twisted nematic cell which operates in a conventional manner such as described in British Pat. No. 1,372,868, which corresponds to German Offenlegungsschrift No. 2,158,563.

As can be clearly seen in FIG. 2, both the rear electrode 7 and the associated terminal electrode 9 as well as the insulating layers 11 and 12 extend into the region of the filling opening 14 and exactly to the edge of the respective carrier plates 2 and 3. Thus, the end surface or edge surfaces of the two electrodes 7 and 9 are not covered by the insulating layers 11 and 12 and lie in the plane of the end surfaces of the plates 2 and 3. The filling opening is enclosed by a metallization 16, which in the present case, consists of a chrome/nickel layer 17 and a gold covering layer 18. This metallization forms an electrically conductive contact with the end surfaces of the electrodes 7 and 8 and is covered by a solder plug 21 consisting of an eutectic tin lead alloy. The solder plug 21 closes off the filling opening 14 and simultaneously improves the electrical contact between the rear electrode 7 and the terminal electrode 9 which contact is already assured by the metallization.

The above described liquid crystal cell 30 can be favorably produced in the following manner. First, the desired electrode patterns of a plurality of carrier plates are formed on an enlarged area glass strip or plate member and then insulating layers are deposited thereon. The electrodes can consist of antimony-dope tin oxide and it is expedient to employ silicon dioxide for the insulating layer or coating. The glass strips or plate members coated in this way are then preliminarily separated at suitable intervals such as by scoring and then breaking upon the score lines to form the individual carrier plates. A cleaner division or separation can also be achieved by utilizing diamond sawing or abrasive cutting to form the separating step. The separated carrier plates are then provided with an orientation layer whereupon they are provided with a glass solder frame and then secured to one another. Then the surrounding of the frame openings are metallized and the cell chamber is filled with the liquid crystal substance and then tightly closed by the solder plugs such as 21. The described sequence of steps can also be varied. Thus, for example, the step of separating could be carrier out at a later time, for example, following a glass soldering process of the two carrier members to form a plurality of interconnected cells, which are subsequently then separated into the individual cells.

The invention is not limited to the illustrated exemplary embodiment. Thus, it is not necessary to carry out the formation of the conductive bridge at the position of the filling opening 14 or to produce the exposed electrode end surfaces by a separation process. Also, it is frequently possible to use only one single insulating layer as this also provides a liquid crystal substance with protection from a DC voltage component. Furthermore, within the scope of the invention, the display can also comprise a plurality of similar conductor bridges, which is desirable in the case of utilizing the cell in a multiplex drive system.

Figure 3:
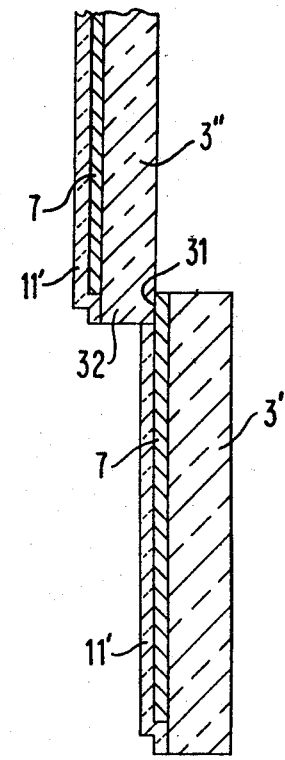
FIG. 3 is a cross sectional view of carrier plates arranged in an overlapping stack according to the invention.

In a possible production sequence, the individual carrier plates such as 3' and 3" of FIG. 3 are provided with their relevant electrodes which are illustrated as conductive electrodes 7 and are then provided with an insulating layer 11'. When providing the insulating layer 11', a plurality of plates (only two plates 3' and 3" are illustrated) are assembled in such a manner that they partially overlap in a manner similar to roof tiles or fish scales. In this way, an area 31 of the conductive coating 7 of the plate 3' adjacent the through contact or conductive bridge can be easily masked by the overlapping portion 32 of the plate 3" and kept free of an insulating material. This provides particularly good results if the insulating layer is deposited in a so-called chemical vapor deposition process.

Although various minor modifications may be suggested by those versed in the art, it should be understood that we wish to embody within the scope of the patent warranted hereon, all such modifications as reasonably and properly come within the scope of our contribution to the art.

We claim:

1. A process of forming a liquid crystal cell having a pair of carrier plates spaced apart by a frame, each of said carrier plates being provided with electrically conductive coatings on an inner surface thereof with at least one electrical conductive coating on one plate forming an electrode connected to a terminal electrode on the other plate by a conductive bridge consisting of at least one metallized layer which engages only an edge surface of each of said electrodes which edge surface lies in the plane of the end surface of the carrier plate, said process including providing a first plate member having the first conductive coatings disposed thereon in a plurality of repeating patterns, providing a second plate member having the second conductive coatings provided thereon in a plurality of repeating patterns, covering the entire first conductive coatings of the first plate member with an insulating layer, covering the second conductive coatings of the second plate member with an insulating layer, subsequent to the steps of covering the plate members with insulating layers securing said plate members together with frames, subdividing each of said plate member into individual carrier plates of the cell with the step of subdividing providing the edge surface of each of the electrodes on the end surfaces of the carrier plate, and subsequent to the step of securing said plates with a frame applying at least one metallized layer on said edge surfaces of the electrodes and an end surface of the plates to form said conductive bridge engaging the electrodes only at said edge surfaces.

2. A process according to claim 1, wherein a plurality of conductive bridges are provided with each conductive bridge connecting an electrode on one plate with a terminal electrode on the other plate.

3. A process according to claim 1, wherein the frame is a glass solder frame which contains an opening and wherein at least one of the conductive bridges is disposed adjacent said opening, with the metallized layers of the conductive bridge being closed off and interconnected by a solder plug disposed in said opening.

4. A process according to claim 1, wherein at least one of the metallized layers consist of gold.

5. A process according to claim 1, wherein the step of subdividing comprises scoring each of said plate members and subsequently breaking each of the plate members along said score.

6. A process according to claim 1, wherein the step of subdividing comprises abrasively cutting each of said carrier plates from said plate members.

7. A process according to claim 1, wherein the step of subdividing comprises cutting each of said carrier plates from the plate members by diamond sawing.

* * * * *